(12) United States Patent
Tang et al.

(10) Patent No.: US 9,426,362 B2
(45) Date of Patent: Aug. 23, 2016

(54) THREE-AXIS OIS FOR SUPER-RESOLUTION IMAGING

(71) Applicant: MEMS DRIVE, INC., Arcadia, CA (US)

(72) Inventors: Tony Tang, Arcadia, CA (US); Roman Gutierrez, Arcadia, CA (US)

(73) Assignee: MEMS DRIVE, INC., Arcadia, CA (US)

( * ) Notice: Subject to any disclaimer, the term of this patent is extended or adjusted under 35 U.S.C. 154(b) by 0 days.

(21) Appl. No.: 14/599,380

(22) Filed: Jan. 16, 2015

(65) Prior Publication Data
US 2016/0212332 A1    Jul. 21, 2016

(51) Int. Cl.
| H04N 5/228 | (2006.01) |
| G06K 9/40 | (2006.01) |
| H04N 5/232 | (2006.01) |
| G02B 26/08 | (2006.01) |
| H04N 5/225 | (2006.01) |

(52) U.S. Cl.
CPC ...... *H04N 5/23232* (2013.01); *G02B 26/0875* (2013.01); *H04N 5/23258* (2013.01); *H04N 5/23287* (2013.01); *H04N 5/23296* (2013.01); *H04N 5/2257* (2013.01)

(58) Field of Classification Search
CPC ........... H04N 5/2254; H04N 5/23296; H04N 5/23258; H04N 5/23232; H04N 5/23248; H04N 9/045; G02B 13/009; G02B 7/102; G03B 13/36; G06T 2207/10016
USPC ......... 348/208.1, 208.2, 208.4, 208.7, 219.1, 348/345
See application file for complete search history.

(56) References Cited

U.S. PATENT DOCUMENTS

| 6,236,430 | B1 * | 5/2001 | Suzuki | H04N 3/1587 348/219.1 |
| 2002/0097324 | A1 * | 7/2002 | Onuki | H04N 5/2259 348/208.99 |
| 2005/0001906 | A1 * | 1/2005 | Sato | H04N 5/23248 348/208.6 |
| 2009/0284609 | A1 * | 11/2009 | Matsunaga | H04N 5/23248 348/208.12 |
| 2010/0329582 | A1 * | 12/2010 | Albu | G06T 5/003 382/255 |
| 2013/0101377 | A1 * | 4/2013 | Hawkes | B65G 47/28 414/589 |
| 2013/0235220 | A1 * | 9/2013 | Williams | H04N 5/23264 348/208.1 |
| 2014/0125825 | A1 | 5/2014 | Baer et al. | |

* cited by examiner

*Primary Examiner* — Trung Diep
(74) *Attorney, Agent, or Firm* — Sheppard Mullin Richter & Hampton LLP

(57) ABSTRACT

Systems and methods are provided for super-resolution imaging using 3-axis OIS. A super-resolution image may be created by enabling optical image stabilization (OIS) in three axes using an OIS system on a camera of an image capturing device; capturing an image of a scene using an image sensor of the camera; shifting the image on the image sensor by a predetermined subpixel amount; capturing the subpixel shifted image; and constructing a super-resolution image of the scene using the image and the subpixel shifted image. In one particular implementation, a position sensor may measure a positional drift of the image sensor after capturing the image. Using this measured positional drift, a time sufficient to shift the image sensor by a predetermined subpixel amount may be determined. The OIS may subsequently be disabled in one or two axes for the determined time.

18 Claims, 11 Drawing Sheets

THREE-AXIS OIS FOR SUPER-RESOLUTION IMAGING

TECHNICAL FIELD

The present disclosure relates generally to electro-mechanical devices and systems, such as microelectromechanical systems (MEMS). More particularly, various embodiments of the technology disclosed herein are directed to image resolution enhancing techniques that use 3-axis OIS systems.

BACKGROUND

Current methods of image zooming include digital zooming and optical zooming. In digital zooming, a picture is cropped to an area of interest and the pixels of that area are blown up. Although the area of interest is "zoomed in" the resolution is significantly less than the physical pixel resolution of the image sensor. An alternative to digital zooming is optical zooming, where a motor moves the optical elements of the camera lens to change the lens' focal length, i.e. the distance between the center of the lens and the image sensor. Although optical zooming samples the actual zoomed image by the physical resolution of the image, its hardware requirements are ill-suited for miniature cameras such as those found on mobile devices.

In practice, super-resolution techniques may be applied to achieve higher resolutions when performing a digital zooms. Super-resolution can refer to various image processing techniques that construct a high-resolution (HR) image of a scene from multiple low-resolution (LR) images of the same scene. During image capture, different LR images of the same scene are taken by slightly moving the optical path to the image sensor after each image capture. Subsequently, a HR image (i.e., a super-resolution image) is constructed by combining information from a reference LR image with the information from the other, shifted LR images.

A critical step in the super-resolution reconstruction of images is image registration. During image registration the motion parameters of the LR images are estimated, and the LR images are then geometrically aligned. To achieve accurate super-resolution image reconstruction, image alignment must be precise. Accordingly, the availability of accurate registration parameters between the multiple LR input images is critical for achieving good performance in image super-resolution. Generally speaking, registration with a subpixel accuracy is necessary for the success of the reconstruction process.

Another important consideration in super-resolution reconstruction is motion blur. It is desirable to avoid blurring caused by the motion of the camera during image capture. If the amount of motion blur approaches or exceeds one pixel, little resolution enhancement, if any, can be made to a reference LR image. Motion blur is a particular concern for cameras used in handheld mobile devices.

Current implementations of super-resolution techniques in handheld mobile devices rely on optical image stabilization (OIS) along two orthogonal axes: pitch and yaw. The 2-axis OIS attempts to eliminate the image blur caused by the motion of the camera. Additionally, current super-resolution techniques implemented in mobile devices rely on the OIS itself to command movement of an actuator to cause specific subpixel movements of the optical path during image sampling.

BRIEF SUMMARY OF THE DISCLOSURE

Systems and methods are provided in various embodiments for image resolution enhancing techniques that use a 3-axis OIS system. In one embodiment of the technology disclosed herein, an image capturing device includes a camera including an image sensor and an OIS system for enabling 3-axis OIS. In this embodiment, the image capturing device includes one or more processors and one or more non-transitory computer-readable mediums operatively coupled to at least one of the one or more processors and having instructions stored thereon that, when executed by at least one of the one or more processors, cause at least one of the one or more processors to: capture an image of a scene using the camera; shift the image on the image sensor by a predetermined subpixel amount; capture the subpixel shifted image using the camera; and construct a super-resolution image of the scene using the image and the subpixel shifted image. In this embodiment, the OIS is enabled in three axes when the image and the sub-pixel shifted image are captured.

In another embodiment of the technology disclosed herein, the OIS system stabilizes an image on the image sensor of the camera by moving the image sensor in three degrees of freedom. In implementations of this embodiment, the OIS system includes a MEMS actuator that moves the image sensor in the three degrees of freedom. In further implementations of this embodiment, the image capturing device is a mobile device.

In another embodiment of the technology disclosed herein, the image capturing device includes one or more position sensors configured to measure a positional drift of the image sensor after capturing the image. In implementations of this embodiment, the instructions cause the one or more processors to shift the image on the image sensor by a predetermined subpixel amount by performing the operations of: determining a time sufficient to shift the image sensor by the predetermined subpixel amount based on the measured positional drift of the image sensor; and deactivating the OIS in one or two axes for the determined time. In further implementations of this embodiment, one of the one or more position sensors is a gyroscope.

In yet another embodiment of the technology disclosed herein, the 3-axis OIS stabilizes an image on the image sensor of the camera by moving a lens of the camera in three degrees of freedom.

In yet another embodiment of the technology disclosed herein, the instructions further cause the one or more processors to: cause deformation of a lens of the camera to optimize a point-spread function (PSF) over a specific area of the camera lens; and digitally zoom in to a scene in the area of the camera lens corresponding to the optimized PSF, wherein the zoomed in scene is the scene corresponding to the image.

In yet another embodiment of the technology disclosed herein, a method includes enabling optical image stabilization (OIS) in three axes using an OIS system on a camera of an image capturing device; causing deformation of a lens of the camera to optimize a point-spread function (PSF) over a specific area of the camera lens; digitally zooming in to a scene in the area of the camera lens corresponding to the optimized PSF; and constructing a super-resolution image of the scene by sampling the scene a plurality of times, where the OIS is enabled in three axes each time the scene is sampled. In an implementation of this embodiment, constructing the super-resolution image of the scene includes applying a deconvolution algorithm during super-resolution image construction to remove blur associated with the PSF.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
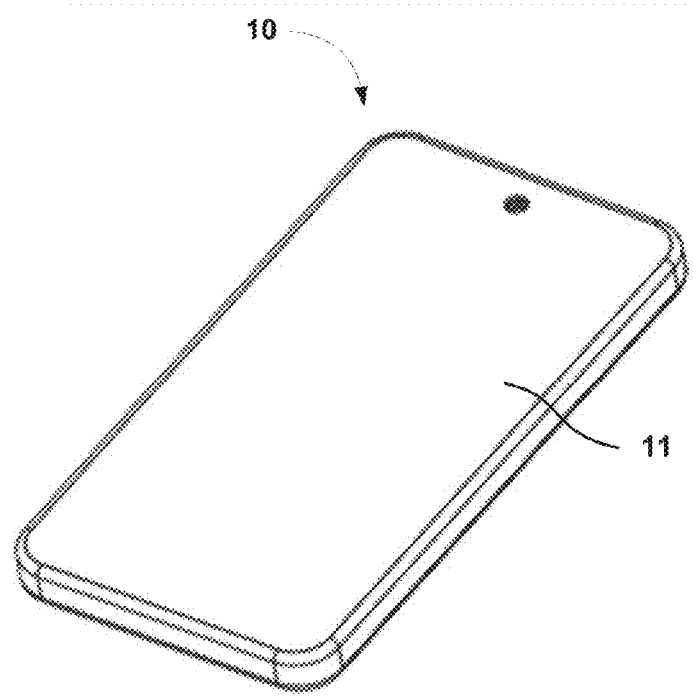
FIG. 1A is a perspective view of an example mobile device in which various embodiments of the technology disclosed herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

There are two problems with current implementations of super-resolution imaging techniques in handheld mobile devices that prevent accurate capture of subpixel shifts of a reference picture. First, such implementations rely on 2-axis OIS systems that fail to correct the roll of the imaging device during image capture. However, a 2-axis (pitch and roll) OIS of the image fails to stabilize/compensate for the roll direction of the camera. Thus, the optical path to the image sensor is not completely stabilized and there is motion blur from the variations of the rotation aperture. This motion blur is particularly pronounced along the edges of the image where there is the greatest variability in the rotation aperture. Thus, pitch and yaw (2-axis) OIS-based techniques cannot be used to effectively stabilize an image to less than one pixel in handheld mobile devices.

Second, current implementations rely on the OIS itself to effectuate specific subpixel movements of the camera lens during image sampling. In such techniques an OIS processor commands an actuator to move a subpixel distance (e.g., ½ pixel). However, issuing the command to the actuator takes time (e.g., 10 ms), during which the 2-axis OIS must compensate for multiple pixels (e.g. 5) of real movement. Because of precision limits on both the actuator and 2-axis OIS motion sensor, large errors in the measured pixel position may occur at this stage. These errors are passed along to the motion parameters of the image registration process, thereby resulting in misalignment of the LR images during the registration process.

Therefore, various embodiments of the technology disclosed herein are directed to super-resolution imaging based on a 3-axis OIS system. The disclosed technology samples a plurality of images using an OIS system that stabilizes each image in three degrees of freedom (e.g., pitch, yaw, and roll). Applying such a technique, all motions that could result in motion blur are compensated for, thereby allowing for subpixel precision during image registration.

In further embodiments, the disclosed technology relies on the natural jitter of a user's hand to make subpixel shifts of the optical path to the image sensor during image sampling. In implementations of these embodiments, OIS is disabled in one or two degrees of freedom (e.g., X, X-Y, or Y) for the OIS system in between image captures. Following a user jitter-induced subpixel shift, the motion stabilization is enabled in all three degrees of freedom and a shifted image is captured. Accordingly, such a technique avoids the pixel-shift errors introduced by reliance on the OIS system and actuator for making subpixel shifts.

Application of the technology disclosed herein may significantly enhance the resolution of an image captured by a camera with a limited image sensor size, a limited pixel density, or both (e.g., a handheld mobile phone camera). Further still, application of the disclosed technology may be used to digitally zoom in to an area of an image at a resolution beyond the physical resolution of the image capture device.

FIG. 1A illustrates a perspective view of an example mobile device 11 (e.g., a mobile phone), which contains a miniature camera 12 in which various embodiments may be implemented. Miniature camera 12 may employ an image sensor package, such as a moving image sensor package. Sizing of miniature camera 12 can be optimized to facilitate the incorporation of miniature camera 12 within or as part of mobile device 11. For example, the overall thickness of miniature camera 12 may be less than that of mobile device 11 so that miniature camera 12 can be incorporated within mobile device 11 to present a consumer-friendly design. Additionally, other dimensions of miniature camera 12 may also be sized appropriately to allow other components to fit inside, e.g., the housing or enclosure of mobile device 11. Miniature camera 12 may achieve various functionality related to image sensor movement, such as OIS, automatic focusing (AF), alignment between lens and image sensor, and the like.

Figure 1B:
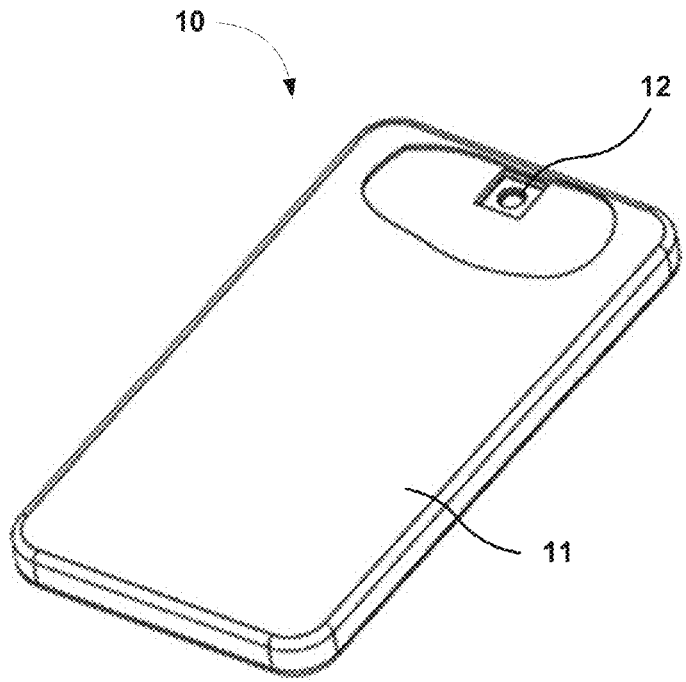
FIG. 1B is a breakout perspective view of the example mobile device of FIG. 1A.

FIG. 1B illustrates mobile device 10 of FIG. 1A with the housing/enclosure partially exposed to reveal miniature camera 12 in accordance with one embodiment of technology disclosed herein. It should be noted that although various embodiments disclosed herein are presented in the context of miniature camera modules for use in mobile devices, such as mobile phones, tablet personal computers (PCs), laptop PCs, and the like, the disclosed technology can be adapted for use in other devices or contexts, such as larger format cameras, medical imaging, large scale imaging, video, etc.

Figure 2A:
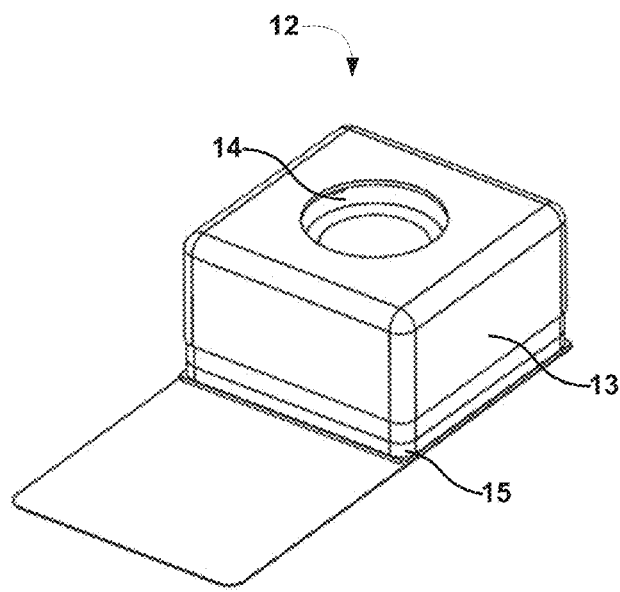
FIG. 2A is a perspective view of an example camera module that may be implemented in the mobile device of FIG. 1A in accordance with various embodiments of the technology disclosed herein

FIG. 2A illustrates a perspective view of miniature camera 12. Miniature camera 12 can include an electromagnetic interference (EMI) shield 13, a lens barrel 14, and a moving image sensor package 15. Lens barrel 14 may be aligned and mounted to moving image sensor package 15 using commercial active alignment equipment. EMI shield 13 may be attached after barrel assembly or may be mounted to lens barrel 14 prior to assembly of moving image sensor package 15. During camera module design and manufacturing, lens barrel 14 may be modified to achieve a desired optical performance, such as but not limited to: field of view; optical transfer function; stray light; ghosting; chromatic aberration; distortion; and focusing range. Moreover, and further during camera module design and manufacturing, lens barrel 14 may be modified to achieve a desired mechanical performance, such as but not limited to: thickness; width; and shape. The aforementioned lens barrel modifications may be made substantially independent of moving image sensor package 15. Conversely, changes may be made to the moving image sensor package 15 can be made substantially independent of lens barrel 14.

Figure 2B:
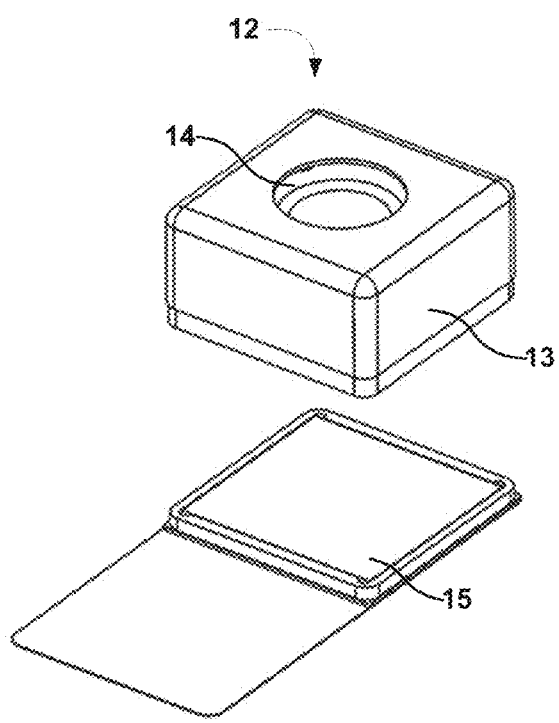
FIG. 2B is an exploded perspective view of the example camera module of FIG. 2A.

FIG. 2B illustrates a partially exploded view of miniature camera 12 with a moving image sensor package 15. The EMI shield 13 is shown as being attached to lens barrel 14 and separated from moving image sensor package 15. The moving image sensor package 15 is relatively thin and substantially the same thickness as a conventional non-moving image sensor package.

Figure 3A:
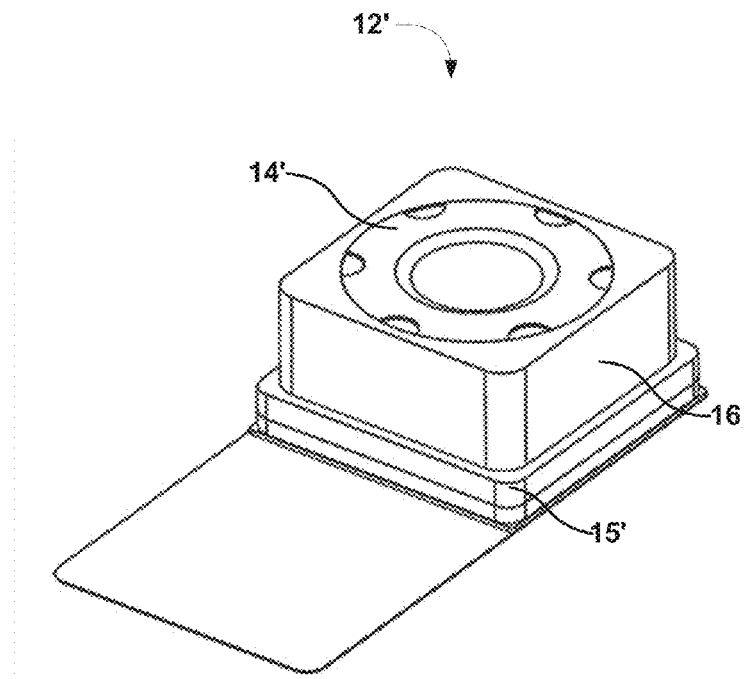
FIG. 3A is a perspective view of another example camera module that may be implemented in the mobile device of FIG. 1A in accordance with various embodiments of the technology disclosed herein.

FIG. 3A illustrates a perspective view of another example miniature camera 12' that does not incorporate an EMI shield in accordance with another embodiment. For example, the EMI shield may have been removed, or omitted entirely as a design option of miniature camera 12'. Miniature camera 12', similar to miniature camera 12, may include a lens barrel 14', an autofocus (AF) actuator 16, and a moving image sensor package 15'. The AF actuator 16 may be a voice coil motor (VCM) type of actuator, a MEMS actuator, a piezoelectric actuator, a shape memory alloy actuator, or any other type of actuator. The AF function may also be achieved using a tunable lens, such as a liquid lens, a liquid crystal lens, a deformable polymer lens, or the like.

Various embodiments of the technology disclosed herein employ OIS functionality, such as three axis OIS that is compensates for camera movement involving roll, pitch, and yaw. It should be noted that such OIS features can be added to miniature camera 12' without requiring any changes to the AF actuator 16 or lens barrel 14. The motion of an image sensor inside moving image sensor package 15 can be used to compensate for camera pointing temporal variations. It should be noted that camera size may be limited either by the size of lens barrel 14 or the size of AF actuator 16 and the thickness of the moving image sensor package 15. Moreover, AF actuator 16 may electrically connect to moving image sensor package 15.

Figure 3B:
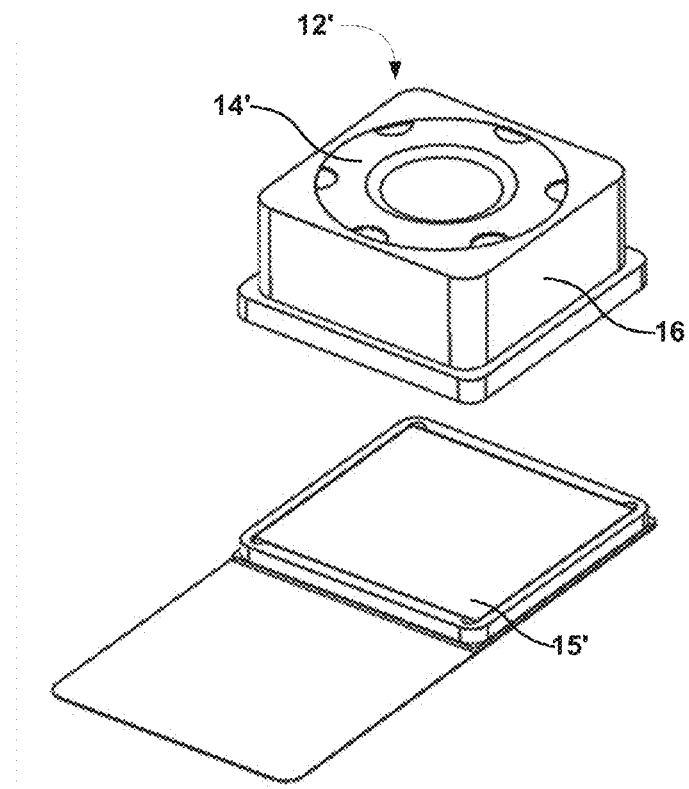
FIG. 3B is an exploded perspective view of the example camera module of FIG. 3A.

FIG. 3B illustrates a partially exploded view of miniature camera 12' with a moving image sensor package 15' of FIG. 3A. The lens barrel 14' is shown as being attached to the AF actuator 16 and separated from moving image sensor package 15. Moving image sensor package 15 can be relatively thin and substantially the same thickness as a conventional image sensor package where the image sensor is not moving.

Figure 4:
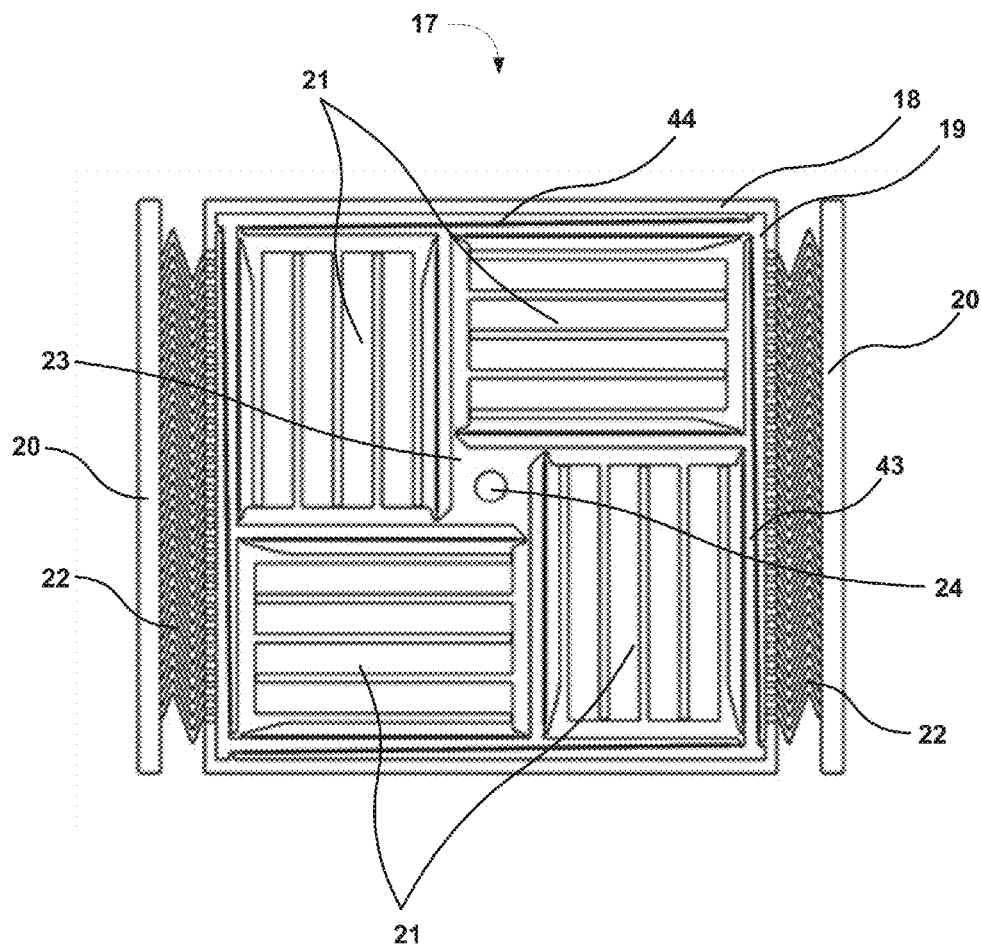
FIG. 4 is a top view of an example MEMS actuator utilized in accordance with various embodiments of the technology disclosed herein.

FIG. 4 illustrates a top planar view of an example MEMS actuator 17 that can be utilized to implement the aforementioned 3-axis OIS functionality in accordance with various embodiments of the technology disclosed herein. MEMS actuator 17 can be used to move the image sensor inside the moving image sensor package, e.g., moving image sensor package 15' of FIGS. 3A and 3B. In one embodiment, MEMS actuator 17 is designed to move the image sensor in three degrees of freedom in order to enable OIS in a miniature camera module (such as miniature camera 12' of FIGS. 3A and 3B) in all three rotational degrees of freedom.

Some examples of MEMS actuators suitable for moving an image sensor are described in U.S. Application Ser. No. 61/975,617, which is incorporated herein by reference in its entirety. In one embodiment, MEMS actuator 17 can include a middle frame 18 with contact pads 19, an outer frame separated into two electrical bars 20, four actuation areas 21, a central anchor 23 with a glue hole 24, and a plurality of electrical connection flexures 22. The number of glue holes 24 is not limited to one, as there may be multiple holes depending on the relevant electrical connection requirements. The glue hole 24 may have multiple purposes including, e.g., enabling a structural bond to mount MEMS actuator 17 to a carrier substrate by applying thermal epoxy, as well as enabling an electrical connection from MEMS actuator 17 to a conductive trace or substrate by applying conductive epoxy, solder, metal pastes, or other electrical connection methods. The outer electrical bars 20 can provide connections between the MEMS actuator 17 and the rest of the moving image sensor package. Contact pads 19 on middle frame 18 can provide electrical connections between the image sensor (not shown) and MEMS actuator 17.

Each actuation area 21 may contain electrostatic comb drives that provide motive force in one linear direction. The four actuation areas 21 together provide movement in the X and Y directions, and rotation about the Z axis. MEMS actuator 17 can therefore move in two linear degrees of freedom and one rotational degree of freedom to achieve OIS of a miniature camera in all three rotational degrees of freedom. The actuation areas 21 are connected to the central anchor 23 through parallel motion control flexures 43 and to the middle frame 18 through connection flexures 44 that are stiff in the motion degree of freedom and soft in other degrees of freedom. In one embodiment, actuation areas 21 includes features that limit mechanical movement during drop or shock to reduce the stress on the parallel motion control flexures 43 and the connection flexures 44. In one embodiment, the image sensor is attached to the outer frame 20 and the central anchor 23, while the middle frame 18 is attached to the rest of the moving image sensor package.

It should be noted that the X/Y dimensions of MEMS actuator 17 are related to the moving image sensor package size. In one embodiment, the outline dimensions of the middle frame 18 substantially match the size of the image sensor. In another embodiment, the outline dimensions of the outer frame 20 substantially match the size of the image sensor. In still another embodiment, the thickness of the MEMS actuator 17 is approximately 150 micrometers and the in-plane dimensions are approximately 8 mm in the X dimension and 6 mm in the Y dimension.

Figure 5:
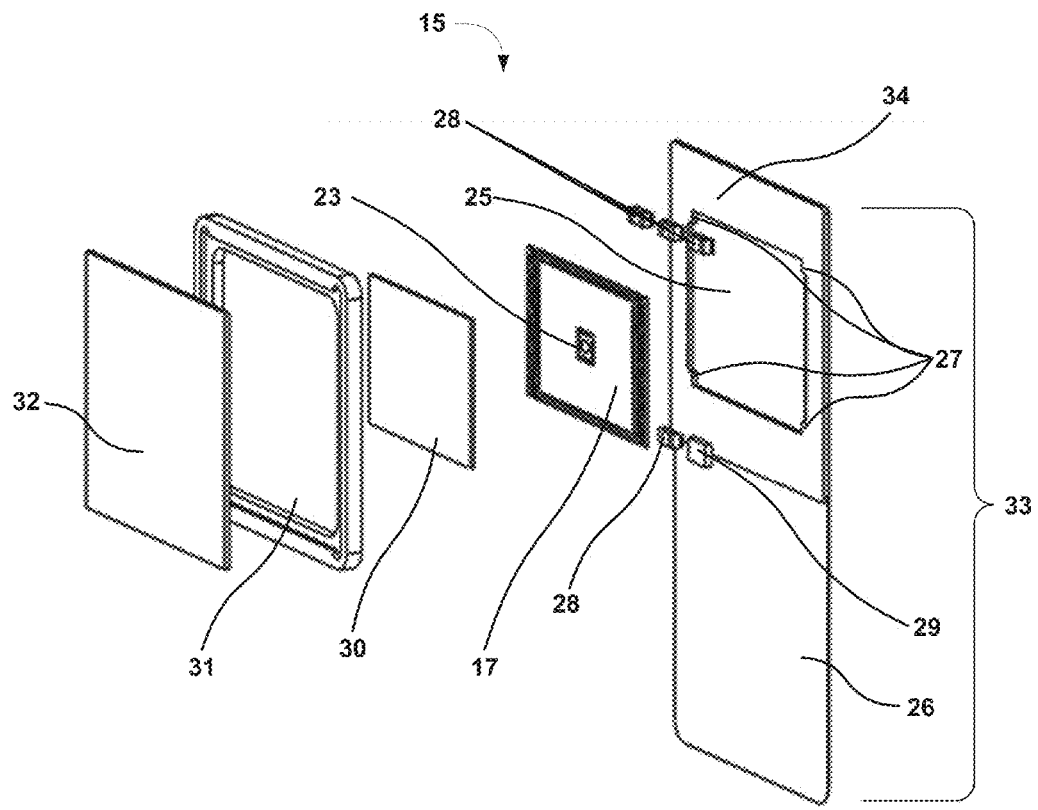
FIG. 5 is an exploded perspective view of an example image sensor package utilized in accordance with various embodiments of the technology disclosed herein.

FIG. 5 is an exploded perspective view of moving image sensor package 15 in accordance with one embodiment of the technology disclosed herein. Moving image sensor package 15 can include, but are not limited to the following components: a substrate 33; a plurality of capacitors or other passive electrical components 28; a MEMS actuator driver 29; a MEMS actuator 17; an image sensor 30; an image sensor cap 31; and an infrared (IR) cut filter 32. Substrate 33 can include a rigid circuit board 34 with an opening 25 and in-plane movement limiting features 27, and a flexible circuit board acting as a back plate 26. The rigid circuit board 34 may be constructed out of ceramic or composite materials such as those used in the manufacture of plain circuit boards (PCB), or some other appropriate material(s). Moving image sensor package 15 may include one or more drivers 29. It should be noted that the shape of opening 25 is designed to fit MEMS actuator 17, and may provide in-plane movement limiting features 27 on the corners if needed to improve the in-plane drop performance. The size of opening 25 is adjustable based on the size of the image sensor 30.

The back plate 26 may include embedded copper traces and features, which, besides routing electrical signals, may also function as a spacer to control the z-gap between the back plate 26 and the MEMS actuator 17. Since the thermal conduction of air is roughly inversely proportional to the gap, and the image sensor 30 can dissipate a substantial amount of power between 100 mW and 1 W, the gaps between the image sensor 30, the stationary portions of the MEMS actuator 17, the moving portions of the MEMS actuator 17, and the back plate 26 are maintained at less than approximately 50 micrometers. In one embodiment, the back plate 26 can be manufactured out of a material with good thermal conduction, such as copper, to further improve the heat sinking of the image sensor 30. In one embodiment, the back plate 26 has a thickness of approximately 50 to 100 micrometers, and the rigid circuit board 34 has a thickness of approximately 150 to 200 micrometers. In one embodiment, the MEMS actuator fixed portion 23 is attached to the back plate 26 by thermal epoxy through the glue hole 24.

As described above, various embodiments sample a plurality of images using a 3-axis OIS system (e.g. a system with MEMS actuator 17). The advantage of the 3-axis OIS is the ability to compensate for camera roll during the image sampling process. Hence, 3-axis OIS ensures that there is no motion blur in the captured images. Examples of OIS that can be implemented in the technology disclosed herein can be found in U.S. Pat. No. 8,768,157, U.S. patent application Ser. No. 14/586,307, and U.S. Patent Application Ser. No. 62/003,421, each of which is incorporated herein by reference in its entirety. It should be noted that the technology disclosed herein need not be limited to or exclusively reliant upon three axis OIS, but can also operate in the context of other OIS systems/methods. However, compensation for camera movements in three degrees of freedom with OIS facilitates the subpixel movements necessary for accurate super-resolution imaging.

Figure 6:
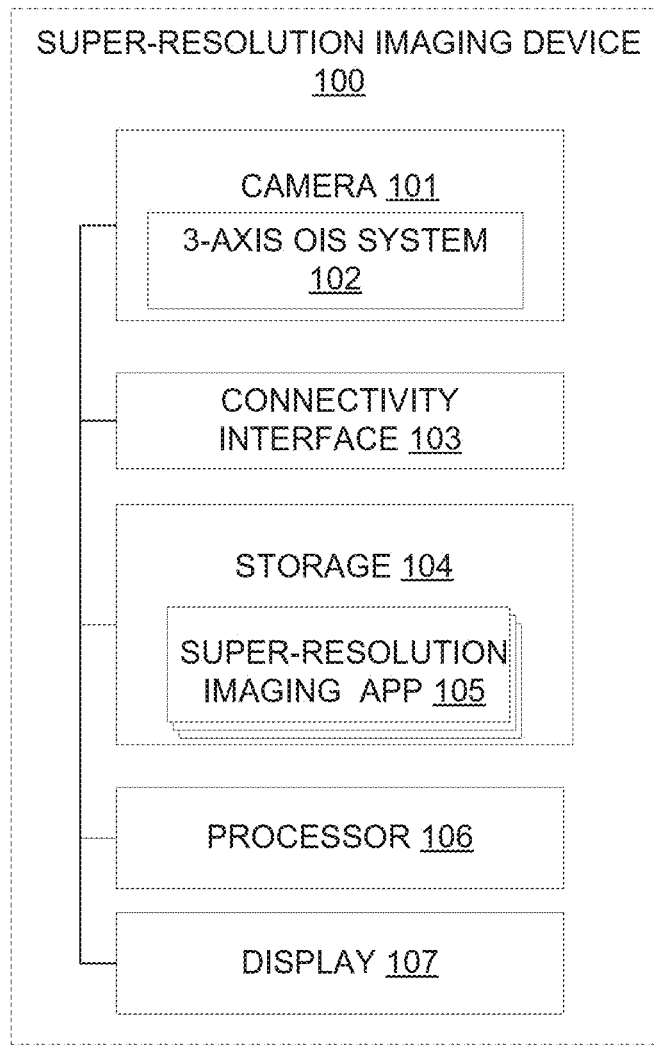
FIG. 6 is a block diagram of an example super-resolution imaging device that may be used to implement embodiments of technology disclosed herein.

FIG. 6 is a block diagram of an example super-resolution imaging device 100 that may be used to implement embodiments of the technology disclosed herein. Super-resolution imaging device 100 may be any handheld imaging device (e.g., smartphone, tablet, laptop, DSLR camera, point-and-shoot camera, etc.) operable to capture a plurality of images of a scene and construct a super-resolution image of the scene based on the sampled images. As illustrated, super-resolution imaging device 100 comprises a camera 101 with a 3-axis OIS system 102, connectivity interface 103, storage 104 with super-resolution imaging application 105, processor 106, and display 107.

Camera 101 comprises a 3-axis OIS system 102 configured to stabilize a captured image along three axes (e.g., pitch, yaw, and roll). In one embodiment, OIS system 102 varies the optical path to the image sensor by moving an image sensor package such as, for example, image sensor package 16. In these embodiments, the image sensor package comprises an actuator (e.g. MEMS actuator 17) configured to move the image sensor in three degrees of freedom. In alternative embodiments, OIS system 102 varies the optical path to the image sensor by moving a lens of camera 101 in three degrees of freedom. In the above-described embodiments, OIS system 102 may comprise one or more position sensors (e.g., a gyroscope, accelerometer, or a magnetometer) for detecting relative position and movement of the imaging device 100. In further embodiments, OIS system 102 may include an application-specific integrated circuit (ASIC) for 3-axis OIS. For example, the ASIC may be configured to command shifts of the image sensor or lens of the camera and otherwise track the motion of the imaging device.

Storage 104 may comprise volatile memory (e.g. RAM), non-volatile memory (e.g. flash storage), or some combination thereof. In various embodiments, storage 104 may store a super-resolution imaging application 105 that when executed by a processor (e.g. processor 106) enables super-resolution imaging processes in accordance with embodiments disclosed herein. For example, super-resolution imaging application 105 may be integrated as part of a mobile device's camera application. Additionally, storage 104 is operable to store a plurality of image samples captured and super-resolution images constructed using super-resolution imaging application 105.

Display 107 graphically presents information to a user of super-resolution imaging device 100. For example, display 107 may graphically present captured image samples, constructed super-resolution images, and a user-interface associated with super-resolution imaging application 105. In various embodiments, display 107 may comprise a touchscreen user interface that allows a user to interact with super-resolution imaging application 105.

Figure 7:
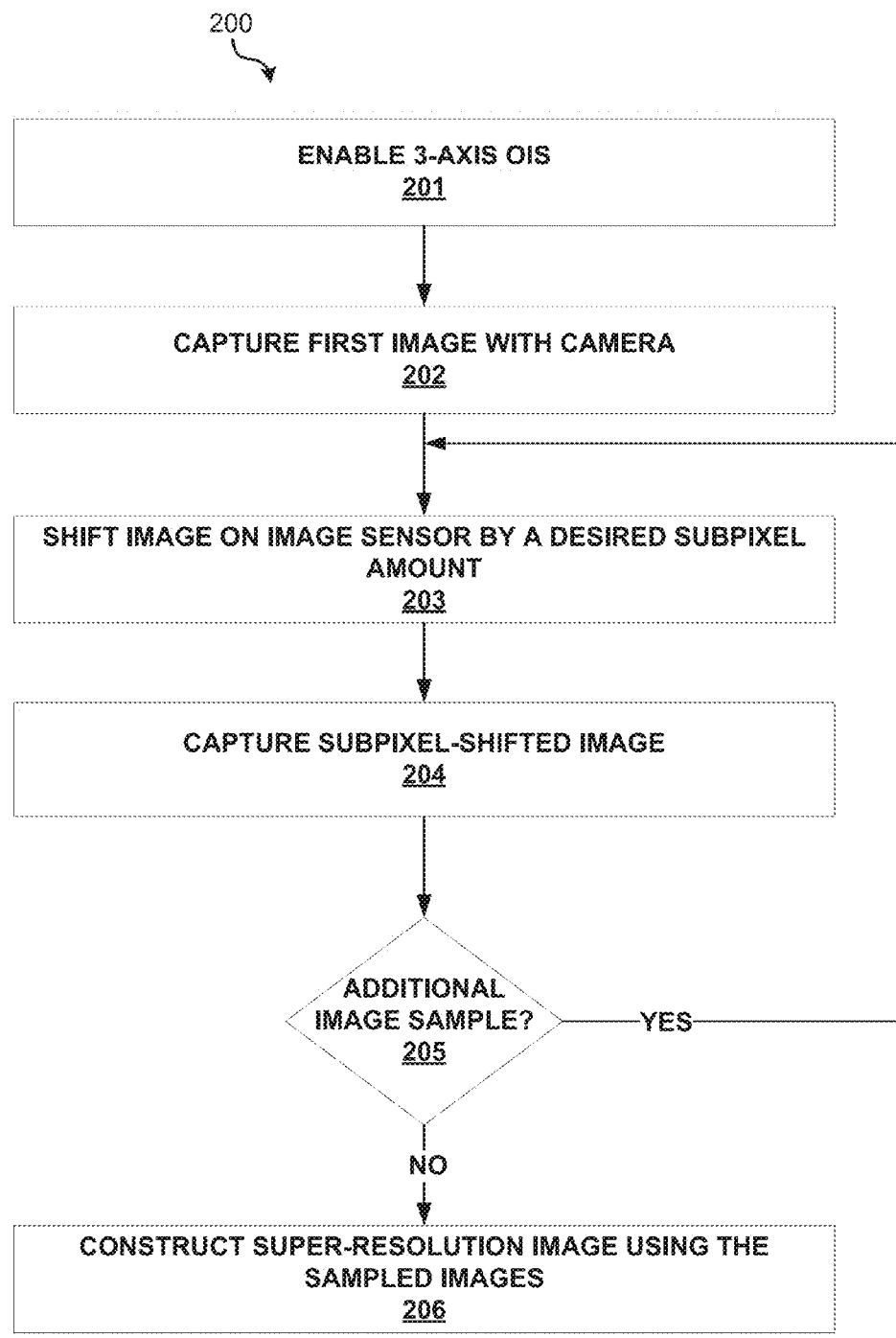
FIG. 7 is an operational flow chart illustrating an example method of sampling a plurality of images using a 3-axis OIS system for super-resolution imaging in accordance with various embodiments.

FIG. 7 is an operational flow chart illustrating an example method 200 of sampling a plurality of images using a 3-axis OIS system 102 for super-resolution imaging in accordance with various embodiments. It should be noted that method 200 may be implemented by a device 100 with a 3-axis OIS system 102 configured to vary the optical path to the image sensor by moving either the camera lens or the image sensor (e.g., image sensor with MEMS actuator 17.) Method 200 may be implemented using a super-resolution imaging application 106 such as, for example, an application integrated in a mobile device's camera application. In various embodiments a user may interact with a display 105 of device 100 to select a super-resolution mode of image capture or enable a super-resolution digital zooming functionality. In such embodiments, when a user captures an image of a particular scene or digitally zooms in to a particular scene, method 200 may be performed.

In order to implement a super-resolution imaging method 200 that combines a plurality of lower resolution images to generate a higher resolution image, it is necessary to eliminate or reduce blur by less than a pixel. Accordingly, at operation 201 three-axis OIS is enabled in preparation for image capture. In one embodiment, the three-axis OIS may be enabled in response to initiating a camera application on a mobile device. In this embodiment, when an image is not being captured the three-axis OIS may be disabled to conserve battery life. Following enablement of three-axis OIS, any subsequently captured images are stabilized in three degrees of freedom (e.g. pitch, yaw, and roll).

At operation 202, a first image of a scene is captured with the device's camera. In various embodiments, the first image may be used as a reference image of the scene with which subsequent images may be combined using a super-resolution registration technique. It should be noted that the first image (and each of the subsequently sampled images) may be temporarily buffered or permanently stored in a storage of the imaging device. In association with operation 202, OIS system 102 may use one or more position sensors to determine an initial position of the camera. Accordingly, when subsequent images are captured, their subpixel shift may be determined with respect to this reference position.

Following capture of the first image, at operation 203 the optical path to the image sensor is shifted by a desired subpixel amount. For example, depending on the desired super-resolution image detail, the optical path may be shifted by ⅛ pixel, ¼ pixel, ½ pixel, etc. In embodiments, the optical path is shifted such that subsequently sampled images remain coplanar with the first image.

In one embodiment, this subpixel shift may be made by an actuator of the 3-axis OIS system 102. In an alternative embodiment, further described below with reference to FIG. 8, the subpixel shift is made by disabling OIS along one or two degrees of freedom and waiting for the natural jitter of a user's hand to shift the optical path. In this alternative embodiment, 3-axis OIS is enabled once the shift is completed.

At operation 204, a subpixel-shifted image of the scene is captured with the camera. In association with operation 204, OIS system 102 may use one or more position sensors to determine a position of the camera. Accordingly, the subpixel shift of the captured image is stored for use during super-resolution image construction. It should be noted that the one or more position sensors may continuously determine a position of the camera during image sampling or, alternatively, may determine a position of the camera at discrete times (e.g., when each image is captured).

At decision 205, it is determined if additional image samples need to be taken to construct the super-resolution image. In various embodiments, the number of sampled images may be a user-selected value, a predetermined value (e.g., by a super-resolution imaging application), or some combination thereof. For example, the number of sampled images may depend on parameters such as a desired resolution of the constructed super-resolution image, computational limitations, memory buffer limitations, storage limitations, the subpixel shift offsets, OIS system accuracy limitations, etc. If additional image samples are needed, then operations 203-204 may be repeated for subsequent samples. Otherwise, method 200 proceeds to operation 206.

At operation 206, a super-resolution image is constructed using the sampled images. As an initial step of the super-resolution image construction, registration takes place. During image registration one of the captured images (e.g. the first) is selected as the reference image. Subsequently, the other sampled images are matched to the coordinate system of the reference image based on the subpixel shifts and other parameters of the images. The final super-resolution image is built on this reference coordinate system. Following registration, a super-resolution image may be constructed by applying super-resolution processing algorithms such as multi-channel restoration algorithms, image fusion and denoising algorithms, image interpolation algorithms, and the like.

Figure 8:
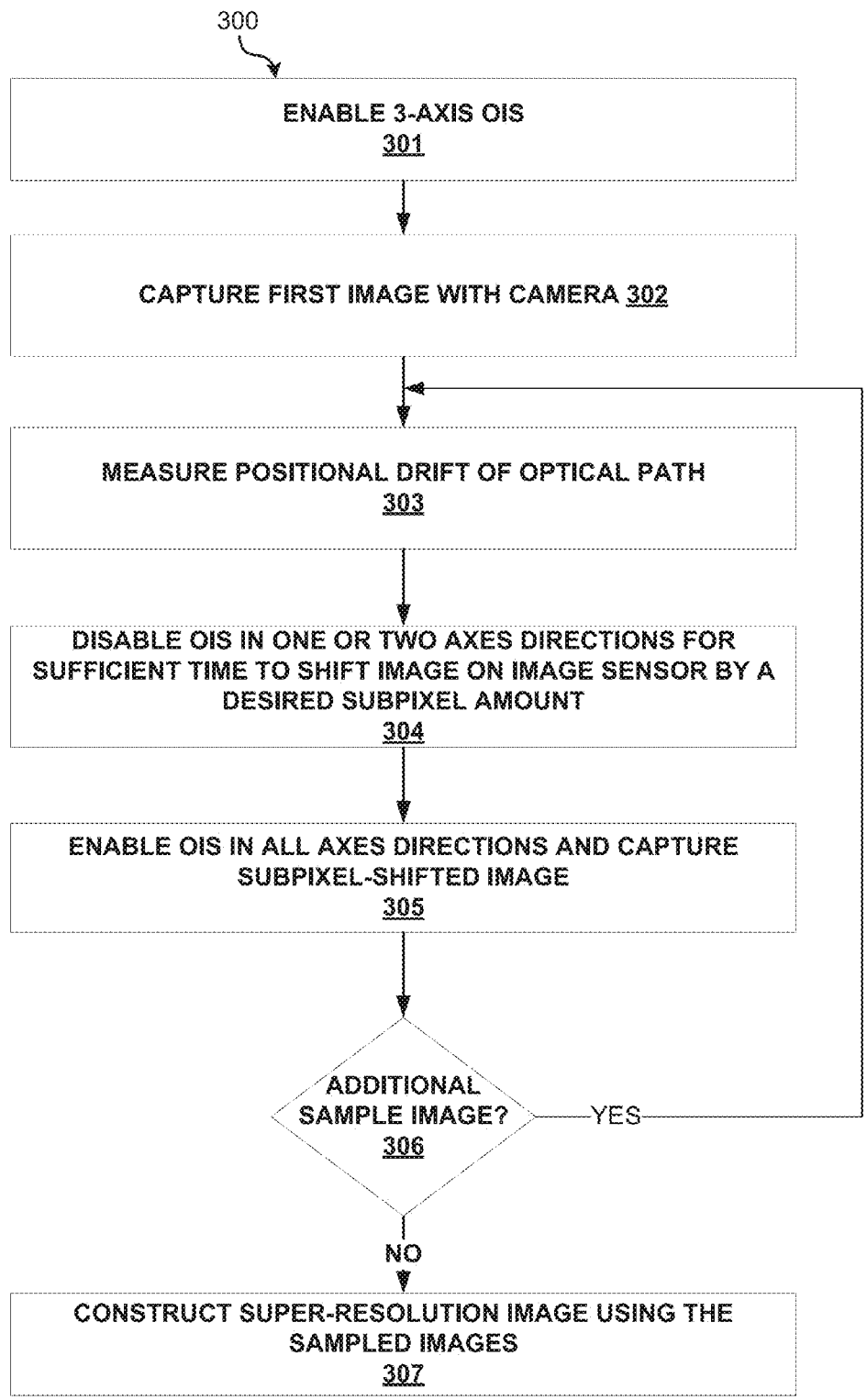
FIG. 8 is an operational flow chart illustrating another example method of sampling a plurality of images using a 3-axis OIS system for super-resolution imaging in accordance with various embodiments.

FIG. 8 is an operational flow chart illustrating another example method 300 of sampling a plurality of images using a 3-axis OIS system 102 for super-resolution imaging in accordance with various embodiments. As will be further described below, method 300 relies on the natural jitter of a user's hand to make subpixel shifts of the image on the image sensor during image sampling. Accordingly, method 300 avoids the pixel-shift errors associated with using an actuator, an OIS system, or both to make subpixel shifts. As before, it should be noted that method 300 may be implemented by a device 100 with a 3-axis OIS system 102 configured to vary the optical path to the image sensor by moving either the camera lens or the image sensor (e.g., image sensor with MEMS actuator 17.)

At operation 301, 3-axis OIS (e.g., pitch, yaw, and roll) is enabled. At operation 302, a first image of the scene is captured with the camera. As discussed above, the first image may be used as a reference image. During capture, the first image is stabilized by using the 3-axis OIS to compensate for jitter motion caused by natural movements of the user's hand. During this compensation, the optical path to the image sensor may be varied in the pitch, yaw, and roll directions.

At operation 303, the positional drift in the pitch, yaw, and roll directions compensated for by the OIS system is measured by one or more position sensors (e.g., a gyroscope, accelerometer, or magnetometer) after the exposure for the captured image is completed. In one embodiment, the measurement occurs at substantially the same time the exposure for the captured image is completed. The positional drift may be measured by one or more position sensors of the OIS system 102 (e.g., gyroscope, accelerometer, magnetometer), a separate position sensor of device 100, or some combination thereof. In various embodiments, the position sensors are configured to measure positional drift with sufficient precision to accurately detect subpixel shifts (e.g. ⅛ pixel, ¼ pixel, ½ pixel, etc.). In alternative embodiments, the positional drift is measured only in the directions where the OIS will be disabled in subsequent operations to cause subpixel shifts of the optical path.

Based on the measured positional drift of the optical path, at operation 304, OIS is disabled for a sufficient amount of time to shift the image on the imager by a desired subpixel amount. Consider, for example, a camera with a 7000 pixel diagonal image sensor and a 70-degree field of view. If a gyroscope measures the camera rotation at 5 degrees/second at the time the first exposure is completed, then it would take 1 ms to shift ½ pixel, 0.5 ms to shift ¼ pixel, and 0.25 ms to shift ⅛ pixel. Accordingly, the gyroscope rotation signal at the time when the first exposure ended may be used to estimate the amount of time the OIS needs to be disabled in one or two directions to shift the image by a desired subpixel amount along one or two axes. It should be noted that in the embodiments described herein, OIS is not disabled in one of the axes.

Figure 9A:
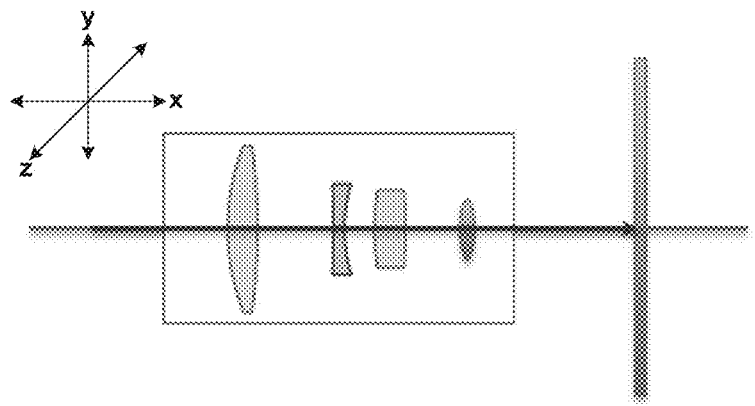
FIGS. 9A-9C illustrate example image shifts in embodiments where the optical path to an image sensor is varied by moving a lens barrel of the camera.
Figure 9B:
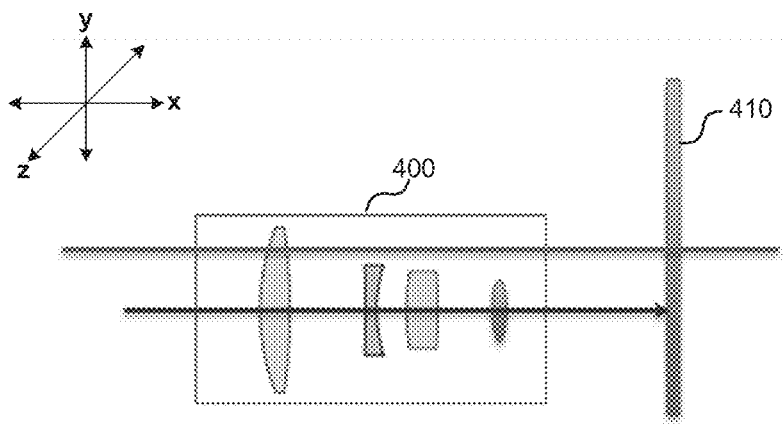
Figure 9C:
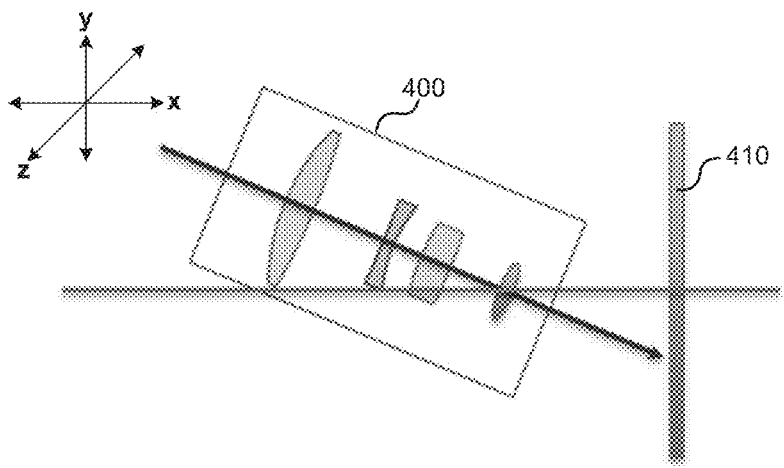

In various embodiments, OIS may be disabled along any one or two axes (e.g., pitch, roll, or pitch and roll) to cause the desired subpixel shift based on the measured positional drift. In a preferred implementation of these embodiments, OIS is never disabled along one of the axes (e.g., pitch, yaw, or roll) during image sampling, thereby ensuring that all of the sampled images are shifted along a common plane. In accordance with these embodiments, FIGS. 9A-9C illustrate example image shifts in embodiments where the optical path to image sensor 410 is varied by moving lens barrel 400. In FIG. 9A, lens barrel 400 is on-axis (i.e., no shift). In FIG. 9B, lens barrel 400 is laterally moved (along one axis), thereby shifting the image. Alternatively, In FIG. 9C, lens barrel 400 is tilted (along one axis), thereby shifting the image.

Figure 10A:
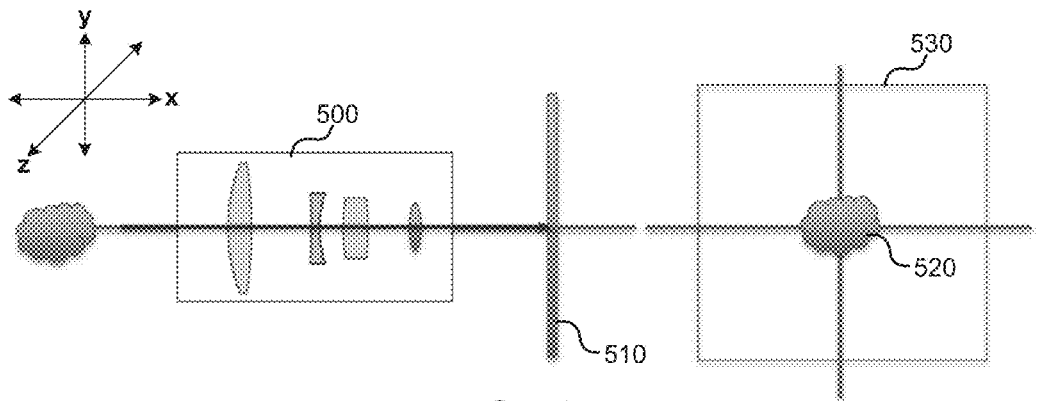
FIGS. 10A-10C illustrate example image shifts in embodiments where the optical path to an image sensor is varied by moving the image sensor instead of a lens barrel of the camera.
Figure 10B:
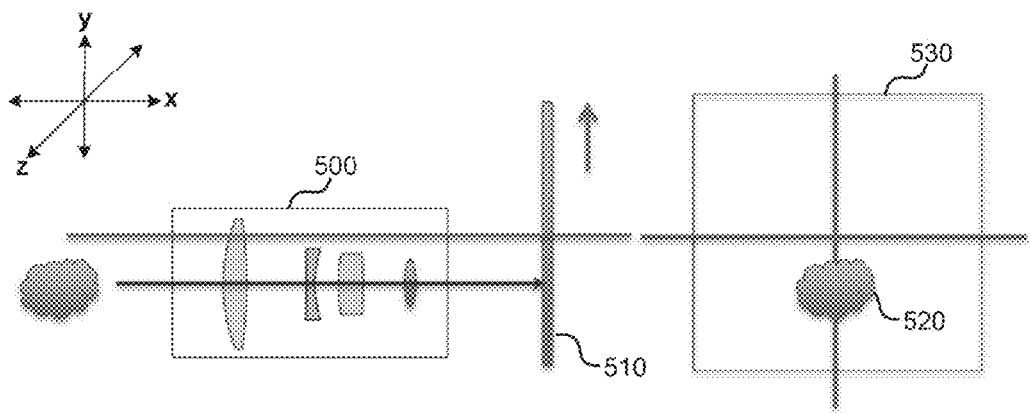
Figure 10C:
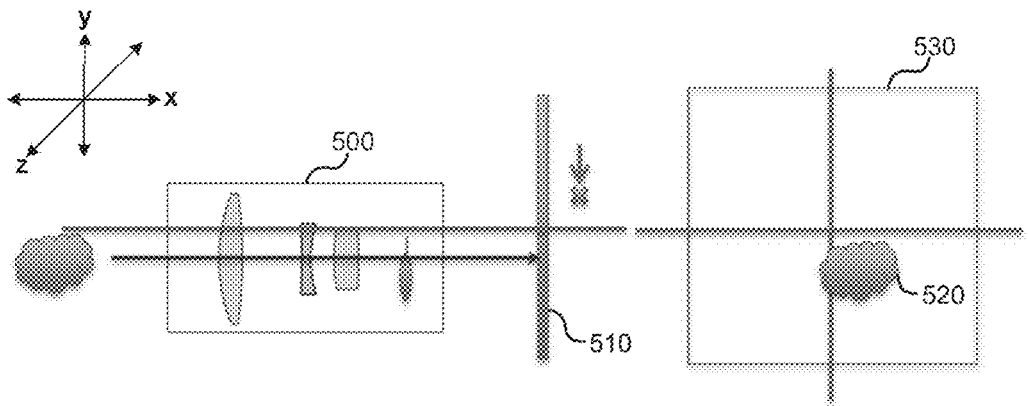

FIGS. 10A-10C illustrate example image shifts in embodiments where the optical path to image sensor 510 is varied by moving image sensor 510 instead of lens barrel 500. In FIG. 10A, image sensor 510 is not shifted. Image 520 is centered on the plane 530 of the image sensor. In FIG. 10B, image sensor 510 is moved along the y axis, thereby causing a first subpixel shift of image 520 on the plane 530 of the image sensor. In FIG. 10C, image sensor 510 is subsequently moved along the z and y axes, thereby causing a second subpixel shift of image 520 on the plane 530 of the image sensor.

Following the desired subpixel shift, at operation 305 the OIS is enabled in all three axes, and a subpixel-shifted image of the scene is captured. Subsequently, at decision 306 it is determined if additional image samples need to be taken to construct the super-resolution image. The number of sampled images may depend on parameters such as a desired resolution of the constructed super-resolution image, computational limitations, memory buffer limitations, storage limitations, the subpixel shift offsets, etc. If additional image samples are needed, then operations 303-305 may be repeated for subsequent samples. Otherwise, method 300 proceeds to operation 307.

At operation 307, a super-resolution image is constructed using the sampled images. As an initial step, registration takes place. Conventionally, image registration methods require a computationally expensive comparison of image-to-image features. However, because method 300 leveraged position sensors to measure the actual amount of subpixel movements of the camera, in one embodiment these measured movements may be used to perform image registration without comparing image-to-image features. Accordingly, the computational load associated with image registration may be greatly reduced in contrast to conventional methods. In an alternative embodiment, a comparison of image-to-image features may also be made during image registration. Following registration, a super-resolution image may be constructed by applying super-resolution processing algorithms such as multi-channel restoration algorithms, image fusion and denoising algorithms, image interpolation algorithms, and the like.

In various embodiments, a deconvolution algorithm may be applied during super-resolution image construction to remove blur associated with the point-spread function (PSF) of the camera lens. In implementations of these embodiments, application of the deconvolution algorithm may comprise determining the shape and location of the PSF, and convolving the inverse of the PSF with a higher resolution image created during registration.

In various embodiments, camera 101 of super-resolution imaging device 100 may comprise a variable lens with a configurable PSF. For example, the lens of camera 101 may be deformed/tuned such that the PSF is optimized over the center of the lens, over the edges of the lens, or some other location of the lens. In these embodiments, super-resolution digital zooming may be performed over a selected section of an image by tuning camera lens to optimize the PSF over the selected section of the image and thereafter creating a superresolution image of this section of the image in accordance with the super-resolution imaging methods (e.g. method 300) disclosed herein.

Figure 11:
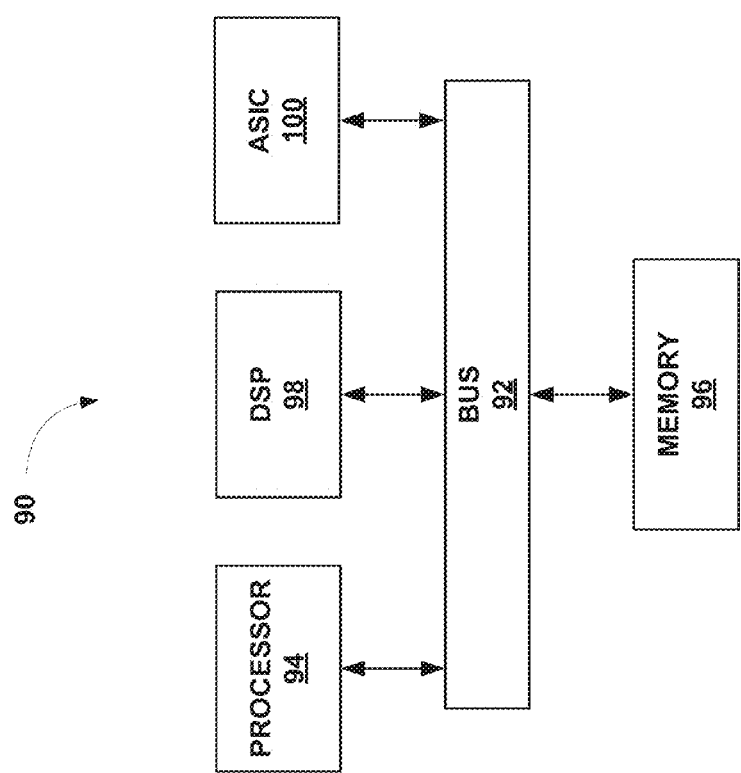
FIG. 11 illustrates an example chip set that can be utilized in implementing architectures and methods for 3D imaging in accordance with various embodiments of the technology disclosed herein.

FIG. 11 illustrates a chip set/computing module 90 in which embodiments of the technology disclosed herein may be implemented. Chip set 90 can include, for instance, processor, memory, and additional image components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 90 includes a communication mechanism such as a bus 92 for passing information among the components of the chip set 90. A processor 94, such as an image processor has connectivity to bus 92 to execute instructions and process information stored in a memory 96. A processor may include one or more processing cores with each core configured to perform independently. Alternatively or in addition, a processor may include one or more microprocessors configured in tandem via bus 92 to enable independent execution of instructions, pipelining, and multithreading. Processor 94 may also be accompanied with one or more specialized components to perform certain processing functions and tasks such as one or more digital signal processors, e.g., DSP 98, such as an OIS DSP, image sensor, OIS gyroscope, and/or one or more application-specific integrated circuits (IC) (ASIC) 100, such as that which can be utilized to, e.g., drive a MEMS actuator for achieving OIS, zoom, and/or AF functionality. DSP 98 can typically be configured to process real-world signals (e.g., sound) in real time independently of processor 94. Similarly, ASIC 100 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The aforementioned components have connectivity to memory 96 via bus 92. Memory 96 includes both dynamic memory (e.g., RAM) and static memory (e.g., ROM) for storing executable instructions that, when executed by processor 94, DSP 98, and/or ASIC 100, perform the process of example embodiments as described herein. Memory 96 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 90. After reading this description, it will become apparent to a person skilled in the relevant art how to implement the application using other computing modules or architectures.

In this document, the terms "computer program medium" and "computer usable medium" are used to generally refer to transitory or non-transitory media such as, for example, memory 96, or other memory/storage units. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 90 to perform features or functions of the present application as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    enabling optical image stabilization (OIS) in three axes using an OIS system on a camera of an image capturing device, wherein the 3-axis OIS stabilizes an image on the image sensor of the camera by moving the image sensor in three degrees of freedom;

capturing an image of a scene using an image sensor of the camera;
shifting the image on the image sensor by a predetermined subpixel amount;
capturing the subpixel shifted image; and
constructing a super-resolution image of the scene using the image and the subpixel shifted image,
wherein the OIS is enabled in three axes when the image and the sub-pixel shifted image are captured.

2. The method of claim 1, wherein the image capturing device is a handheld mobile device.

3. The method of claim 1, wherein the OIS system comprises a MEMS actuator configured to move the image sensor in the three degrees of freedom.

4. The method of claim 1, further comprising:
deforming a lens of the camera to optimize a point-spread function (PSF) over a specific area of the camera lens; and
digitally zooming in to a scene in the area of the camera lens corresponding to the optimized PSF, wherein the zoomed in scene is the scene corresponding to the image.

5. A method, comprising:
enabling optical image stabilization (OIS) in three axes using an OIS system on a camera of an image capturing device;
capturing an image of a scene using an image sensor of the camera;
using one or more position sensors to measure a positional drift of the image sensor after capturing the image;
shifting the image on the image sensor by a predetermined subpixel amount by:
determining a time sufficient to shift the image sensor by the predetermined subpixel amount based on the measured positional drift of the image sensor; and
deactivating the OIS in one or two axes for the determined time;
capturing the subpixel shifted image; and
constructing a super-resolution image of the scene using the image and the subpixel shifted image,
wherein the OIS is enabled in three axes when the image and the sub-pixel shifted image are captured.

6. The method of claim 5, wherein the 3-axis OIS stabilizes an image on the image sensor of the camera by moving a lens of the camera in three degrees of freedom.

7. The method of claim 5, wherein one of the one or more position sensors is a gyroscope.

8. The method of claim 5, wherein the three axes consist of a pitch axis, a yaw axis, and a roll axis, and wherein deactivating the OIS in one or two axes comprises deactivating the OIS in the pitch axis, the yaw axis, or the pitch and yaw axes.

9. An image capturing device, comprising:
a camera comprising an image sensor and an OIS system for enabling 3-axis wherein the 3-axis OIS stabilizes an image on the image sensor of the camera by moving the image sensor in three degrees of freedom;
one or more processors; and
one or more non-transitory computer-readable mediums operatively coupled to at least one of the one or more processors and having instructions stored thereon that, when executed by at least one of the one or more processors, cause at least one of the one or more processors to:
capturing an image of a scene using the camera;
shift the image on the image sensor by a predetermined subpixel amount;
capturing the subpixel shifted image using the camera; and
construct a super-resolution image of the scene using the image and the subpixel shifted image,
wherein the OIS is enabled in three axes when the image and the sub-pixel shifted image are captured.

10. The device of claim 9, wherein the device is a handheld mobile device.

11. The device of claim 9, wherein the OIS system comprises a MEMS actuator configured to move the image sensor in the three degrees of freedom.

12. The device of claim 9, wherein the instructions, when executed by at least one of the one or more processors, further cause the one or more processors to:
cause deformation of a lens of the camera to optimize a point-spread function (PSF) over a specific area of the camera lens; and
digitally zoom in to a scene in the area of the camera lens corresponding to the optimized PSF, wherein the zoomed in scene is the scene corresponding to the image.

13. An image capturing device, comprising:
a camera comprising an image sensor and an OIS system for enabling 3-axis OIS;
one or more position sensors configured to measure a positional drift of the image sensor;
one or more processors; and
one or more non-transitory computer-readable mediums operatively coupled to at least one of the one or more processors and having instructions stored thereon that, when executed by at least one of the one or more processors, cause at least one of the one or more processors to:
capture an image of a scene using the camera;
shift the image on the image sensor by a predetermined subpixel amount by performing the operations of:
determining a time sufficient to shift the image sensor by the predetermined subpixel amount based on the measured positional drift of the image sensor; and
deactivating the OIS in one or two axes for the determined time;
capture the subpixel shifted image using the camera; and
construct a super-resolution image of the scene using the image and the subpixel shifted image,
wherein the OIS is enabled in three axes when the image and the sub-pixel shifted image are captured.

14. The device of claim 13, wherein the 3-axis OIS stabilizes an image on the image sensor of the camera by moving a lens of the camera in three degrees of freedom.

15. The device of claim 13, wherein one of the one or more position sensors is a gyroscope.

16. The device of claim 13, wherein the three axes consist of a pitch axis, a yaw axis, and a roll axis, and wherein deactivating the OIS in one or two axes comprises deactivating the OIS in the pitch axis, the yaw axis, or the pitch and yaw axes.

17. A method, comprising:
enabling optical image stabilization (OIS) in three axes using an OIS system on a camera of an image capturing device, wherein the 3-axis OIS stabilizes an image on the image sensor of the camera by moving the image sensor in three degrees of freedom or by moving a lens of the camera in three degrees of freedom;

causing deformation of a lens of the camera to optimize a point-spread function (PSF) over a specific area of the camera lens; and digitally zooming in to a scene in the area of the camera lens corresponding to the optimized PSF; and constructing a super-resolution image of the scene by sampling the scene a plurality of times, wherein the OIS is enabled in three axes each time the scene is sampled.

18. The method of claim 17, wherein constructing the super-resolution image of the scene comprises applying a deconvolution algorithm during super-resolution image construction to remove blur associated with the PSF.

* * * * *